United States Patent
Miyazaki et al.

(10) Patent No.: US 8,052,416 B2
(45) Date of Patent: Nov. 8, 2011

(54) INJECTION NOZZLE AND MOLDING APPARATUS

(75) Inventors: Takemi Miyazaki, Hamura (JP); Shigeru Hosoe, Hachioji (JP); Yuiti Fujii, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 37 days.

(21) Appl. No.: 12/663,830

(22) PCT Filed: May 13, 2008

(86) PCT No.: PCT/JP2008/058771
§ 371 (c)(1), (2), (4) Date: Dec. 9, 2009

(87) PCT Pub. No.: WO2008/152872
PCT Pub. Date: Dec. 18, 2008

(65) Prior Publication Data
US 2010/0183764 A1 Jul. 22, 2010

(30) Foreign Application Priority Data
Jun. 14, 2007 (JP) .................................. 2007-157306

(51) Int. Cl.
*B29C 45/17* (2006.01)

(52) U.S. Cl. .......... 425/567; 425/DIG. 42; 425/DIG. 47
(58) Field of Classification Search .................. 425/542, 425/543, 567, 569, DIG. 42, DIG. 47
See application file for complete search history.

(56) References Cited

U.S. PATENT DOCUMENTS

| | | | | |
|---|---|---|---|---|
| 3,354,508 A * | 11/1967 | Draben | .......................... | 425/569 |
| 5,879,727 A * | 3/1999 | Puri | .............................. | 425/549 |
| 6,921,257 B2 * | 7/2005 | Olaru | ............................ | 425/549 |
| 7,780,435 B2 * | 8/2010 | Huang | .......................... | 425/567 |
| 2004/0037914 A1 * | 2/2004 | Takeuchi et al. | .............. | 425/567 |

FOREIGN PATENT DOCUMENTS

JP  2006-272558  10/2006

OTHER PUBLICATIONS

International Search Report from the Japanese Patent Office mailed Aug. 12, 2008, for International Application No. PCT/JP2008/058771, filed May 13, 2008.

* cited by examiner

*Primary Examiner* — Timothy Heitbrink
(74) *Attorney, Agent, or Firm* — Finnegan, Henderson, Farabow, Garrett & Dunner, L.L.P.

(57) ABSTRACT

Provided is an injection nozzle and a molding apparatus which ensure injection pressure by suppressing resin leakage even when a resin material having a low viscosity is used. In injection molding, it is especially important that the injection nozzle and a fixed die are excellently kept in contact with each other and that the resin is not leaked. Resin leakage from between the injection nozzle and the fixed die lowers molding pressure, increases molding shrinkage of the resin, and directly affects the qualities of a molded product resulting in generation of a sink, transfer failure and the like. Since an O-ring in a circumferential groove of the nozzle closely comes in contact with a concave spherical surface while elastically transforming on the entire circumference, leakage is effectively suppressed even the resin is a heat-curable resin having a low viscosity.

5 Claims, 3 Drawing Sheets

INJECTION NOZZLE AND MOLDING APPARATUS

FIELD OF THE INVENTION

The present invention relates to a molding technique, particularly to an injection nozzle used in a molding apparatus suitable for production of a high-precision product, and a molding apparatus.

BACKGROUND

A molding apparatus capable of injection molding of high-precision optical elements using a resin material is known. In the general molding apparatus, as shown in Patent Literature 1, a movable die is mounted on a movable side die plate, and pressure is applied to it against the fixed die mounted on a fixed die plate. Then, an injection nozzle is made closely come in contact with the outside of the fixed die, and resin is injected into the cavity of the die through the nozzle hole of the injection nozzle and the sprue of the fixed die, whereby the resin is solidified, and a molded product is obtained.

Patent Literature 1: Japanese Unexamined Patent Application Publication No. 2006-272558

DISCLOSURE OF INVENTION

Problems to be Solved by the Invention

In the general molding apparatus of the conventional art, as shown in FIG. 5, the tip of the injection nozzle EN for injecting resin into the die has a convex spherical surface, and a concave spherical surface having a radius greater than that of the convex spherical surface is formed around the open end of the sprue SP of the fixed die DP. When the injection nozzle EN is pressed against the fixed die DP, both spherical surfaces fit to each other (referred to as a spherical surface reception), whereby circular line contact is formed. Thus, the pressure generated between the injection nozzle EN and fixed die DP can be concentrated on a narrow contact portion. This allows a high contact pressure to be generated, and therefore, the nozzle hole AP of the injection nozzle EN and sprue SP can be communicated with each other to suppress leakage of resin from therebetween.

Incidentally, there is an attempt to perform molding operations using the energy-curable resin as represented by heat-curable resin or photo-curable resin. The energy-curable resin is cured when energy is given from the outside. Unlike the regular thermoplastic resin, after having been once cured, the energy-curable resin is hardly subjected to transformation when exposed to a high temperature.

However, one of the problems with the molding operation performed by using the energy-curable resin as represented by heat-curable resin or photo-curable resin is that the energy-curable resin is generally a liquid of low viscosity at the normal temperature, and therefore, there may be a leakage from between the injection nozzle hole and sprue if a conventional spherical surface receiver is employed. To put it more specifically, when the injection nozzle EN having a shape shown in FIG. 5 is employed, the line contact permits the resin material of low viscosity to easily leak out and the injection pressure cannot be increased. As a result, the resin material fails to increase the own pressure inside the molding cavity. This leads to an increased curing shrinkage rate, and a reduced geometric transferability. Thus, high-precision molding operation cannot be achieved. Further, resin leakage is characterized by lower repeatability. This tends to increase variation in the injection pressure, to reduce the reproducibility of the molded product and to increase dimensional variations.

As a test which the present inventors conducted, for example, in the combination of the injection nozzle and fixed die using the conventional spherical surface reception, injection operation was performed using the heat-curable resin having a viscosity of 250 mPa·s. A resin leakage occurred at the combination part, and the injection pressure could be increased only to the level of 5 MPa. This value is much lower than the injection pressure of about 100 MPa which can be achieved when the injection molding operation is performed using the regular thermoplastic resin. Thus, the molding shrinkage increases by this difference, and a sink occurred. This brought about a considerable deterioration in molding transferability.

In view of the problems described above, it is an object of the present invention to provide an injection nozzle and molding apparatus in which the resin leakage is suppressed and the injection pressure can be ensured, even when a resin material of lower viscosity is used.

Means for Solving the Problems

The injection nozzle of the present invention is used in a molding apparatus and on the injection nozzle whose tip is pressed against a die to perform injection molding of the resin material, a ring-shaped elastic member is provided around the nozzle hole formed on the tip.

The present inventors have found out that, when a ring-shaped elastic member is installed on the injection nozzle and this injection nozzle is pressed against the die, the ring-shaped elastic member is transformed to produce a sealing effect against the resin leakage, whereby injection pressure can be increased without the resin being leaked, even when the resin of lower viscosity is utilized.

To be more specific, in the present invention, a ring-shaped elastic member is provided around the nozzle hole formed on the tip. Thus, when the tip is pressed against the die, the ring-shaped elastic member is transformed to seal the space between the injection nozzle and die, and effective suppression of resin leakage is provided. This allows the resin material of high pressure to be pressure-fed from the hole of the injection nozzle to the die, whereby the injection pressure is increased, so that high-precision products can be molded.

According to the specific embodiment of the present invention, the tip of the nozzle pressed against the die has a flat surface. This can make the diameter of the nozzle hole or sprue larger than in the case of the spherical surface reception, and allows the resin material to be injected for a shorter period of time, and hence, the molding cycle to be shorter. The injection nozzle having a flat surface is less affected by the shift with respect to the fixed die as a counterpart. When the die is mounted on the molding apparatus, this arrangement eliminates the need of ensuring a strict positioning with respect to the injection nozzle, and therefore, reduces man hours for setup procedures of die replacement and others. Further, this arrangement eliminates the need of providing both the injection nozzle and fixed die with spherical surface receivers that require high-precision machining, and therefore, reduces machining costs of each of these parts.

According to the specific embodiment of the present invention, the aforementioned resin material is an energy-curable resin. The energy-curable resin includes a heat-curable resin and ultraviolet curable resin for example. The heat-curable resin is cured by heating, and therefore, the liquid heat-curable resin at the normal temperature is supplied into the heated die, and thereby the heat-curable resin can be solidified. In the meantime, the ultraviolet curable resin is solidified by being exposed to ultraviolet rays. After the liquid ultraviolet curable resin at the normal temperature is supplied into a transparent die, the resin is exposed to ultraviolet rays from the outside, whereby the resin is solidified.

EFFECTS OF THE INVENTION

The present invention provides an injection nozzle and molding apparatus wherein resin leakage is suppressed and the injection pressure is ensured even when a resin material of low viscosity is used.

DESCRIPTION OF REFERENCE NUMERALS

Figure 1:
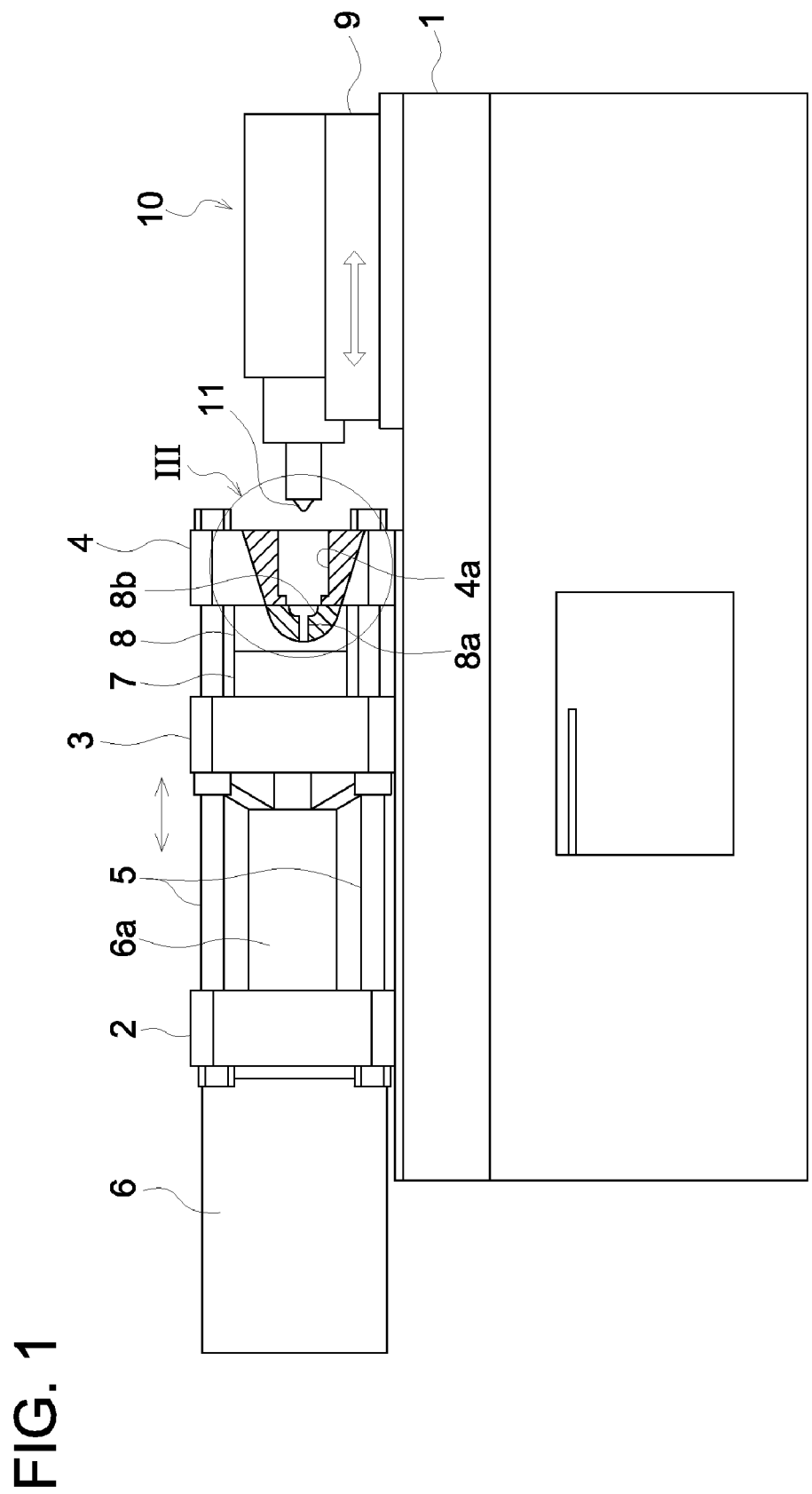
FIG. 1 is a side view of a molding apparatus of an embodiment of the present invention.

1. Base
2. Cylinder plate
3. Movable side die plate
4. Fixed side die plate
5. Tie-bar
6. Cylinder
6a. Piston
7. Movable die
8. Fixed die
8a. Sprue
8b. Spherical surface
8b'. Flat surface
9. Traveling table
10. Injection section
11, 11'. Injection nozzle
11a. Nozzle hole
11b. Spherical surface
11b'. Flat surface
11c. Circumferential groove
12. O-ring

BEST MODE FOR CARRYING OUT THE INVENTION

Figure 2:
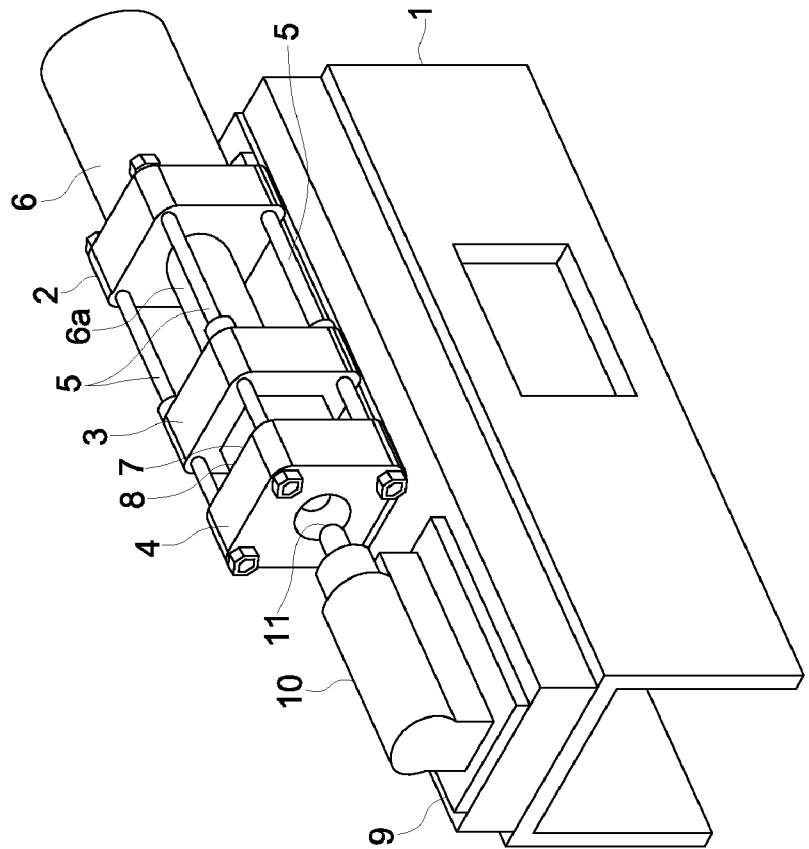
FIG. 2 is a perspective view of a molding apparatus of an embodiment of the present invention.
Figure 3:
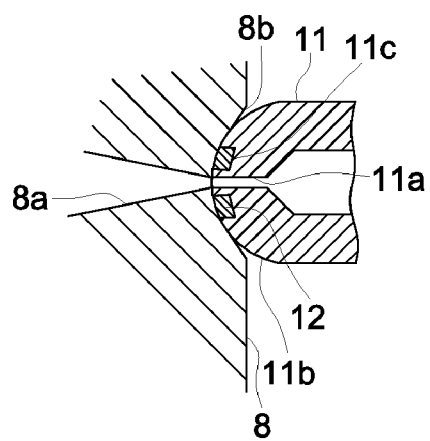
FIG. 3 is an enlarged view of the portion indicated by arrow III in FIG. 1.

Referring to the drawing, the following describes the embodiments of the present invention. FIG. 1 is a side view of a molding apparatus of an embodiment of the present invention. FIG. 2 is a perspective view of a molding apparatus of an embodiment of the present invention. FIG. 3 is an enlarged view of the portion indicated by arrow III in FIG. 1, in which the injection nozzle is placed in close contact, and the illustration of the fixed side die plate is omitted.

In FIG. 1, a base 1 is mounted on a surface plate (not illustrated). The upper side of the base 1 is provided with a comparatively thick and tabular cylinder plate 2, a movable side die plate 3 and a fixed side die plate 4 in that order from the left in such an arrangement as to be opposed to one another. Four tie-bars 5 of round shaft form parallel to the upper surface side of the base 1 are mounted between the cylinder plate 2 and fixed side die plate 4. The cylinder plate 2 and fixed side die plate 4 are fixed on the base 1, while the movable side die plate 3 is movable along the tie-bars 5.

The cylinder plate 2 is provided with a die clamping cylinder 6. The die clamping piston 6a is connected with the movable side die plate 3. A movable die 7 is mounted on the movable side die plate 3 on the side of the fixed side die plate 4, and a fixed die 8 is arranged on the fixed side die plate 4 on the side of the movable side die plate 3. Although not illustrated, a molding cavity is formed inside the die-clamped movable die 7 and fixed die 8. This molding cavity communicates with the concave spherical surface 8b formed on the side of the fixed side die plate 4 through the sprue 8a inside the fixed die 8.

On the base 1, a traveling table 9 is mounted adjacent to the fixed side die plate 4. An injection section 10 is mounted on the traveling table 9. The injection section 10 is provided with an injection nozzle 11 that can be seated on the spherical surface 8b of the fixed die 8 through the through-hole 4a of the fixed side die plate 4.

In FIG. 3, a concave spherical surface 8b with the sprue 8a of the fixed die 8 as a center is formed around the sprue 8a. In the meantime, the injection nozzle 11 has a nozzle hole 11a opened at the tip, and a convex spherical surface 11b formed around the nozzle hole 11a. The convex spherical surface 11b having a radius smaller than that of the concave spherical surface 8b has a circumferential groove 11c around the nozzle hole 11a. An O-ring 12 as a ring-shaped elastic member is provided inside the circumferential groove 11c.

The ring-shaped elastic member is not restricted to the O-ring. It can be quadrilateral in sectional configuration, or the outside surface can be shaped conforming to the spherical surface around the sprue 8a when inserted into the injection nozzle 11.

At the time of maintenance or adjustment, the injection section 10 is retracted from the fixed side die plate 4, and is away from the fixed side die plate 4, as shown in FIG. 1. The injection section 10 travels forward together with the traveling table 9 for the molding. As shown in FIG. 3, the convex spherical surface 11b at the tip of the injection nozzle 11 is pressed against the concave spherical surface 8b, whereby the nozzle hole 11a and sprue 8a communicate with each other. At the same time, elastically transforming on the entire circumference, the O-ring 12 inside the circumferential groove 11c closely comes in contact with the concave spherical surface 8b. This ensures sealing of the space between the spherical surfaces 11b and 8b.

The following describes the operation of the molding apparatus as an embodiment of the present invention: In the first place, the hydraulic pressure is applied inside the die clamping cylinder 6. This procedure allows the die clamping piston 6a to travel to the right in FIG. 1, and the movable side die plate 3 to be driven to the right. When the movable side die plate 3 has moved to the right, the movable die 7 is pushed by this movement and travels to the right to come in close contact with the fixed die 8.

When a molten heat-curable resin is supplied from the injection section 10 under this condition, the heat-curable resin is injected into the sprue 8a of the fixed die 8 through the nozzle hole 11a of the injection nozzle 11, and is filled with pressure into the molding cavity inside the dies 7 and 8 heated by an unillustrated heater through an unillustrated runner. The heat-curable resin heated on the surfaces of the dies 7 and 8 is cured in conformity to the shape of the molding cavity. After curing, the pressure inside the die clamping cylinder 6 is reduced, and the piston 6a is moved to the left in FIG. 1, whereby the die can be opened and the molded product can be taken out.

In such an injection molding operation, it is particularly important that the injection nozzle 11 and fixed die 8 are kept in close contact with each other and the resin does not leak. Resin leakage therefrom will reduce molding pressure, increase molding shrinkage of the resin, and directly affect the qualities of a molded product because of occurrence of a sink or transfer failure. In the present embodiment, elastically transforming on the entire circumference, the O-ring 12 inside the circumferential groove 11c of the nozzle 11 closely comes in contact with the concave spherical surface 8b. This ensures effective prevention of the leakage, even when a resin material of low viscosity is used.

Figure 4:
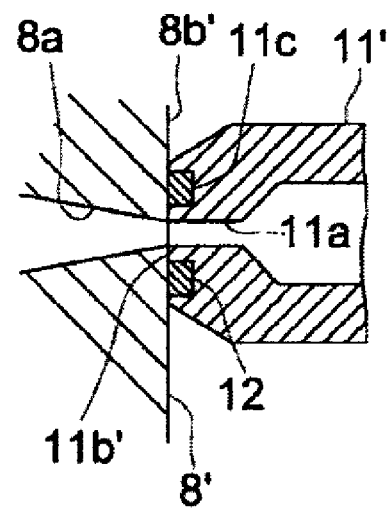
FIG. 4 is the same cross sectional view as FIG. 3, showing a variation of the embodiment.
Figure 5:
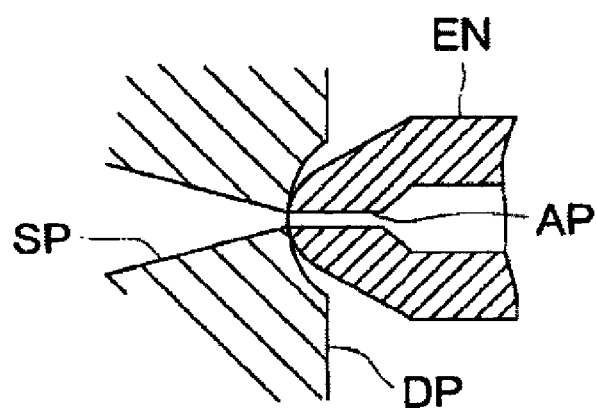
FIG. 5 is a cross sectional view of an injection nozzle and fixed die according to the prior art.

FIG. 4 is the same cross sectional view as FIG. 3, showing a variation of the embodiment. In this example, the tip of the injection nozzle 11' constitutes a flat surface 11b', and the opposed surface on the fixed die 8' also forms a flat surface 8b'. When the injection nozzle 11' is brought in contact with the fixed die 8', the flat surfaces 11b' and 8b' are pressed against each other, whereby the nozzle hole 11a communicates with the sprue 8a. Further, elastically transforming on the entire circumference, the O-ring 12 inside the circumferential groove 11c closely comes in contact with the flat surface 8b'. This ensures sealing of the space between the flat surfaces 11b' and 8b'.

As described above, when the O-ring 12 is brought in surface contact with the fixed die 8' by the injection nozzle 11' having a flat surface, the sealing effect can be drastically improved. Further, when the tip of the injection nozzle 11' has a flat surface 11b', the diameters of the nozzle hole 11a and sprue 8a can be made greater than that in the case of the spherical surface reception. This allows the resin material to be injected in a shorter period of time, hence, the molding cycle to be reduced. The injection nozzle 11' having a flat surface is less affected by the shift with respect to the fixed die 8' as a counterpart. When the dies 7 and 8 are mounted on the molding apparatus, this arrangement eliminates the need of ensuring a strict positioning with respect to the injection nozzle 11', and therefore, reduces the number of man hours for setup procedures as in die replacement. Further, this arrangement eliminates the need of providing both the injection nozzle 11' and fixed die 8' with spherical surface receivers that require high-precision machining, and therefore, reduces machining costs of each of these parts.

If the ring-shaped elastic member is made of a resin such as 66-nylon, polyimide resin or polyamide resin characterized by a high degree of heat resistance and compression strength, the sealing effect can be effectively improved, but there is no restriction to the type of resin. Further, the same sealing effect can be obtained when the ring-shaped elastic member is mounted on the fixed die instead of the injection nozzle. In this case, when the ring-shaped elastic member is provided with maintenance, the die must be removed from the die plate. By contrast, as shown in the aforementioned embodiment, when the ring-shaped elastic member is mounted on the injection nozzle, the injection nozzle together with the injection section can be retracted on the conventional molding apparatus shown in FIGS. 1 and 2. This arrangement preferably ensures easy procurement of a wide space around the ring-shaped elastic member for maintenance.

The present invention has been described with reference to embodiments. It is to be expressly understood, however, that the present invention is not restricted thereto. The present invention can be embodied in a number of variations with appropriate modification or additions.

What is claimed is:

1. An injection nozzle which is used in a molding apparatus to inject a resin material by pressing a tip of the injection nozzle against a die,
    wherein the tip has a flat surface and a circumferential groove which is positioned within the flat surface and around a nozzle hole formed on the tip, and
    wherein the circumferential groove has a ring-shaped elastic member therein.

2. The injection nozzle of claim 1, wherein the elastic member has a flat surface which comes in contact with the die.

3. The injection nozzle of claim 1, wherein the elastic member is made of 66-nylon, polyimide resin or polyamide resin.

4. The injection nozzle of claim 1, wherein the resin material is an energy-curable resin.

5. A molding apparatus comprising the injection nozzle of claim 1 and the die which has a flat surface against which the tip of the injection nozzle is pressed and has a sprue which is opposed to the nozzle hole.

* * * * *

UNITED STATES PATENT AND TRADEMARK OFFICE
CERTIFICATE OF CORRECTION

| | | |
|---|---|---|
| PATENT NO. | : 8,052,416 B2 | Page 1 of 1 |
| APPLICATION NO. | : 12/663830 | |
| DATED | : November 8, 2011 | |
| INVENTOR(S) | : Takemi Miyazaki et al. | |

It is certified that error appears in the above-identified patent and that said Letters Patent is hereby corrected as shown below:

On the Title Page, Item (57), in the Abstract, line 14, "even the resin"
        should read --even when the resin--.

Signed and Sealed this
Sixteenth Day of October, 2012

David J. Kappos
*Director of the United States Patent and Trademark Office*